US012044373B2

(12) United States Patent
Tang et al.

(10) Patent No.: US 12,044,373 B2
(45) Date of Patent: Jul. 23, 2024

(54) LIGHTS WITH MICROLENS ARRAYS

(71) Applicant: Apple Inc., Cupertino, CA (US)

(72) Inventors: Xiaofeng Tang, Santa Clara, CA (US); Kurt R Stiehl, Los Gatos, CA (US); Clarisse Mazuir, San Jose, CA (US); Christopher P Child, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/179,998

(22) Filed: Mar. 7, 2023

(65) Prior Publication Data

US 2023/0349528 A1 Nov. 2, 2023

Related U.S. Application Data

(60) Provisional application No. 63/337,400, filed on May 2, 2022.

(51) Int. Cl.
*F21S 41/265* (2018.01)
*F21S 41/153* (2018.01)

(52) U.S. Cl.
CPC ........... *F21S 41/265* (2018.01); *F21S 41/153* (2018.01)

(58) Field of Classification Search
CPC ....... F21S 41/153; F21S 41/265; F21S 41/692
See application file for complete search history.

(56) References Cited

U.S. PATENT DOCUMENTS

| | | | | |
|---|---|---|---|---|
| 7,059,754 | B2 | 6/2006 | Lekson et al. | |
| 7,540,638 | B2 | 6/2009 | Dassanayake et al. | |
| 8,104,939 | B2 | 1/2012 | Coushaine et al. | |
| 8,314,558 | B2 | 11/2012 | Dassanayake et al. | |
| 9,494,288 | B2 | 11/2016 | Kobayashi | |
| 2020/0332977 | A1 * | 10/2020 | Miedler .................. | F21S 41/43 |
| 2021/0341123 | A1 | 11/2021 | Mototsuji | |

FOREIGN PATENT DOCUMENTS

| | | | |
|---|---|---|---|
| DE | 10308703 | A1 | 11/2004 |
| DE | 102016122856 | A1 | 5/2018 |
| EP | 3486555 | A1 | 5/2019 |
| JP | 2003229006 | A | 8/2003 |
| JP | 2007149552 | A | 6/2007 |
| WO | 2015058227 | A1 | 4/2015 |

* cited by examiner

*Primary Examiner* — Robert J May

(74) *Attorney, Agent, or Firm* — Treyz Law Group, P.C.; G. Victor Treyz; David K. Cole

(57) ABSTRACT

A system may have lights produce illumination. A light may be provided with a collimated light source that produces collimated light. The collimated light source may use lenses or reflective optical elements to produce the collimated light. The light may have an array of light elements each of which emits a respective beam of the illumination. Each light element may have a preshaping lens that receives the collimated light and produces corresponding preshaped output light and an output lens that receives the output light from the preshaping lens and produces a corresponding beam of the illumination. An electrically adjustable shutter may be located between each preshaping lens and output lens to adjust the illumination between a low-beam pattern and high-beam pattern.

20 Claims, 5 Drawing Sheets

LIGHTS WITH MICROLENS ARRAYS

This application claims the benefit of provisional patent application No. 63/337,400, filed May 2, 2022, which is hereby incorporated by reference herein in its entirety.

FIELD

This relates generally to systems, and, more particularly, systems that have lights.

BACKGROUND

Automobiles and other vehicles have lights. Lights may be provided with sources of illumination such as light-emitting diodes or lamps.

SUMMARY

A vehicle may have lights such as exterior light assemblies to produce illumination. An exterior light assembly may have an array of light elements. The array of light elements may be arranged in a ring.

The light may include a collimated light source. The collimated light source may use a ring of lenses or reflective optical elements to produce a ring of collimated light. Each light element in the ring-shaped array of light elements may have a preshaping lens element that receives a portion of the collimated light from the collimated light source and produces corresponding preshaped output light. Each light element may also have an output lens element that is arranged in series with the preshaping lens element. The output lens element receives the output light from the preshaping lens and produces a corresponding beam of illumination.

An electrically adjustable shutter may be located between each preshaping lens and output lens to adjust the illumination between a low-beam pattern and high-beam pattern.

DETAILED DESCRIPTION

A system such as a vehicle or other system may have lights that emit illumination for a roadway or other light. System lights, which may sometimes be referred to as vehicle exterior light assemblies, may be used to provide illumination to illuminate a roadway. This allows vehicle occupants to view the roadway at night and in other low ambient lighting conditions such as at dawn or dusk, when weather reduces ambient light, or when a vehicle is traveling through a dark tunnel. Illumination may also be used to assist autonomous driving systems.

In an illustrative arrangement, a light may be operated in high-beam and low-beam modes. The light may contain an array of light elements arranged in a ring shape or other shape. Each light element may have lens elements and a shutter. The shutter of each element may be used to adjust between high-beam and low-beam modes.

Figure 1:
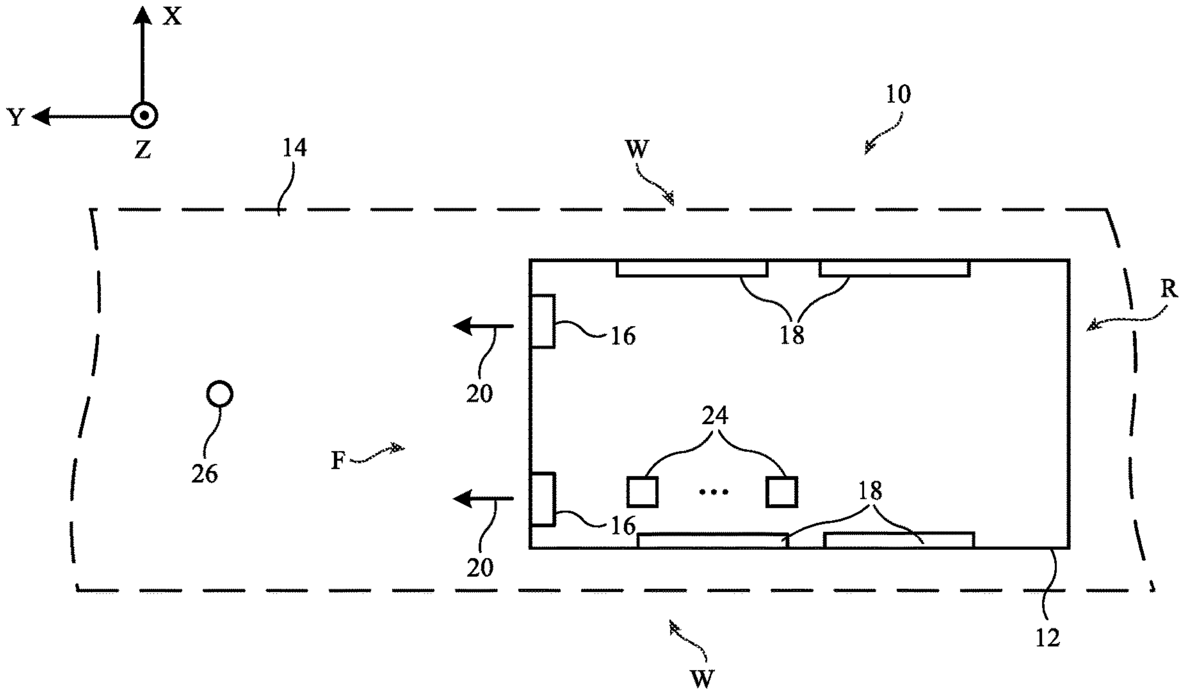
FIG. 1 is a top view of an illustrative vehicle with lights in accordance with an embodiment.

FIG. 1 is a top view of a portion of an illustrative vehicle. In the example of FIG. 1, vehicle 10 is the type of vehicle that may carry passengers (e.g., an automobile, truck, or other automotive vehicle). Configurations in which vehicle 10 is a robot (e.g., an autonomous robot) or other vehicle that does not carry human passengers may also be used. Vehicles such as automobiles may sometimes be described herein as an example. As shown in FIG. 1, vehicle 10 may be operated on roads such as roadway 14.

Vehicle 10 may be manually driven (e.g., by a human driver), may be operated via remote control, and/or may be autonomously operated (e.g., by an autonomous driving system or other autonomous propulsion system). Using vehicle sensors such as lidar, radar, visible and/or infrared cameras (e.g., two-dimensional and/or three-dimensional cameras), proximity (distance) sensors, and/or other sensors, an autonomous driving system and/or driver-assistance system in vehicle 10 may perform automatic braking, steering, and/or other operations to help avoid undesired collisions with pedestrians, inanimate objects, and/or other external structures such as illustrative obstacle 26 on roadway 14.

Vehicle 10 may include a body such as body 12. Body 12 may include vehicle structures such as body panels formed from metal and/or other materials, may include doors, a hood, a trunk, fenders, a chassis to which wheels are mounted, a roof, etc. Windows may be formed in doors 18 (e.g., on the sides of vehicle body 12, on the roof of vehicle 10, and/or in other portions of vehicle 10). Windows, doors 18, and other portions of body 12 may separate the interior of vehicle 10 from the exterior environment that is surrounding vehicle 10. Doors 18 may be opened and closed to allow people to enter and exit vehicle 10. Seats and other structures may be formed in the interior of vehicle body 12.

Vehicle 10 may have automotive lighting such as one or more lights (sometimes referred to as roadway lamps), driving lights, fog lights, daytime running lights, turn signals, brake lights, and/or other lights. As shown in FIG. 1, for example, vehicle 10 may have lights such as lights 16. In general, lights 16 may be mounted on front F of vehicle 10, on rear R of vehicle 10, on left and/or right sides W of vehicle 10, and/or other portions of body 12. In an illustrative configuration, which may sometimes be described herein as an example, lights 16 are mounted to front F of body 12. There may be, as an example, left and right lights 16 located respectively on the left and right of vehicle 10 to provide roadway illumination 20 in the forward direction (e.g., in the +Y direction in which vehicle 10 moves when driven forward in the example of FIG. 1). By shining lights 16 on roadway 14 in front of vehicle 10, vehicle 10 may illuminate roadway 14 and obstacles on roadway 14 such as obstacle 26.

Vehicle 10 may have components 24. Components 24 may include propulsion and steering systems (e.g., manually adjustable driving systems and/or autonomous driving systems having wheels coupled to body 12, steering controls, one or more motors for driving the wheels, etc.), and other vehicle systems. Components 24 may include control circuitry and input-output devices. Control circuitry in components 24 may be configured to run an autonomous driving application, a navigation application (e.g., an application for displaying maps on a display), and software for controlling vehicle climate control devices, exterior lights, interior lighting, media playback, window movement, door operations, sensor operations, and/or other vehicle operations. For example, the control system may form part of an autonomous driving system that drives vehicle 10 on roadways such as roadway 14 autonomously using data such as sensor data. The control circuitry may include processing circuitry and storage and may be configured to perform operations in vehicle 10 using hardware (e.g., dedicated hardware or circuitry), firmware and/or software. Software code for performing operations in vehicle 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid state drives), one or more removable flash drives or other removable media, or other storage. Software stored on the non-transitory computer readable storage media may be executed on the processing circuitry of components 24. The processing circuitry may include application-specific integrated circuits with processing circuitry, one or more microprocessors, a central processing unit (CPU) or other processing circuitry.

The input-output devices of components 24 may include displays, sensors, buttons, light-emitting diodes and other light-emitting devices, haptic devices, speakers, and/or other devices for gathering environmental measurements, information on vehicle operations, and/or user input and for providing output. The sensors in components 24 may include ambient light sensors, touch sensors, force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, and/or other sensors. Output devices in components 24 may be used to provide vehicle occupants and others with haptic output, audio output, visual output (e.g., displayed content, light, etc.), and/or other suitable output.

During operation, the control circuitry of components 24 may gather information from sensors and/or other input-output devices such as lidar data, camera data (images), radar data, and/or other sensor data. Cameras, touch sensors, physical controls, and other input devices may be used to gather user input. Using wireless communications with vehicle 10, remote data sources may provide the control circuitry of components 24 with database information. Displays, speakers, and other output devices may be used to provide users with content such as interactive on-screen menu options and audio. A user may interact with this interactive content by supplying touch input to a touch sensor in a display and/or by providing user input with other input devices. If desired, the control circuitry of vehicle 10 may use sensor data, user input, information from remote databases, and/or other information in providing a driver with driver assistance information (e.g., information on nearby obstacles on a roadway and/or other environment surrounding vehicle 10) and/or in autonomously driving vehicle 10.

Light from lights 16 can distract drivers and others in oncoming traffic, so it may be desirable to provide lights 16 with the ability to operate in a high-beam mode in which light illumination from lights 16 is provided over a relatively large area (e.g., a high-beam pattern that encompasses both objects that are far in front of vehicle 10 and objects that are closer to vehicle 10) and in a low-beam mode in which illumination is provided over a reduced area (e.g., a low-beam pattern that is directed downward towards roadway 14 directly in front of vehicle 10). When a driver or vehicle system in vehicle 10 detects oncoming traffic, the lights may be placed in the low-beam mode to avoid directing excessive light towards the oncoming traffic. When no oncoming traffic is present, the lights may be adjusted to operate in the high-beam mode to increase the area over which illumination is provided.

Figure 2:
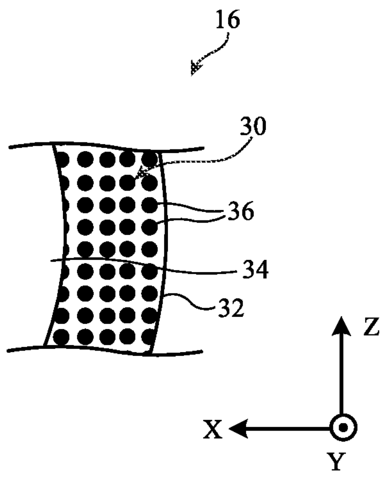
FIG. 2 is a front view of an illustrative light in accordance with an embodiment.

FIG. 2 is a front view of an illustrative adjustable light 16 for vehicle 10. Vehicle 10 may have any suitable number of lights 16 (e.g., at least one, at least two, fewer than three, etc.). In an illustrative arrangement, vehicle 10 has left and right lights 16 on front F of vehicle 10, as described in connection with FIG. 1. Light 16 may be mounted in an opening in body 12 or may otherwise be coupled to a supporting portion of body 12. As shown in FIG. 2, light 16 may include a ring-shaped portion 32 forming a ring-shaped array 30 of light elements 36 (sometimes referred to as a light element array). Each light element 36 emits a different respective beam of light. These emitted beams are used together to produce a desired illumination pattern for light 16. Ring-shaped portion 32 may surround central area 34. Central area 34 may, if desired, be free of visible-light light elements such as elements 36 and may include a painted portion of vehicle body 12, a display, ancillary lighting (e.g., infrared lighting to support infrared sensor operation for autonomous vehicle operation), sensors, and/or other components and/or vehicle structures.

Array 30 may have any suitable shape (e.g., a circular ring, a rectangular ring, a rectangular ring with rounded corners, a straight line, a solid circle, a solid rectangle, another ring shape or solid shape, etc.). Illustrative configurations in which array 30 has a ring shape may be described herein as an example. Light elements 36 may be arranged in a grid or other pattern. For example, elements 36 may be laterally spaced at regular distances along the X and Z dimensions. Arrangements in which elements 36 are unevenly spaced from each other may also be used. The element-to-element spacing D of elements 36 (in the X and Y dimensions) may have a value of at least 1 mm, at least 3 mm, at least 5 mm, less than 3 cm, less than 2 cm, less than 1 cm, less than 5 mm, less than 3 mm, less than 2 mm, less than 1 mm, 0.5 mm to 5 mm, 1 mm to 3 mm, 2 mm to 6 mm, 1 to 7 mm, 3 mm to 5 mm, 0.5 to 4 mm, or other suitable value.

During operation, the light output from each light element 36 may have a pinpoint appearance, so that light 16 has an overall appearance of being composed of a multitude of tiny lighting elements arranged within a ring. Each pinpoint corresponds to a respective beam of light that is being emitted by a respective one of light elements 36. There may be any suitable number of elements 36 in light 16 (e.g., at least 10, at least 50, at least 100, at least 200, at least 400, at least 800, at least 1600, fewer than 3000, fewer than 1500, fewer than 750, fewer than 300, fewer than 150, or fewer than 75). The diameter of light 16 may be at least 2 cm, at least 4 cm, at least 8 cm, at least 20 cm, at least 40 cm, less than 200 cm, less than 100 cm, less than 50 cm, less than 25 cm, or less than 10 cm (as examples). Elements 36 may lie in a common plane (e.g., the XZ plane of FIG. 2) or may have a curved shape that conforms to a curved vehicle body exterior shape. For example, elements 36 may conform to a body surface shape characterized by compound curvature (e.g., curvature about both the X and Z axes of FIG. 2).

Figure 3:
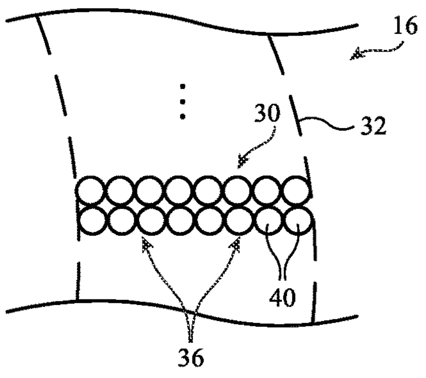
FIG. 3 is a front view of a portion of an illustrative light with a ring-shaped array of light elements in accordance with an embodiment.

FIG. 3 is a front view of a portion of light 16 (e.g., a section of ring-shaped portion 32). As shown in FIG. 3, each light element 36 in ring-shaped array 30 may contain a respective lens 40. There may be an array of lenses 40 (sometimes referred to as a microlens array) covering ring-shaped portion 32 of light 16.

Figure 4:
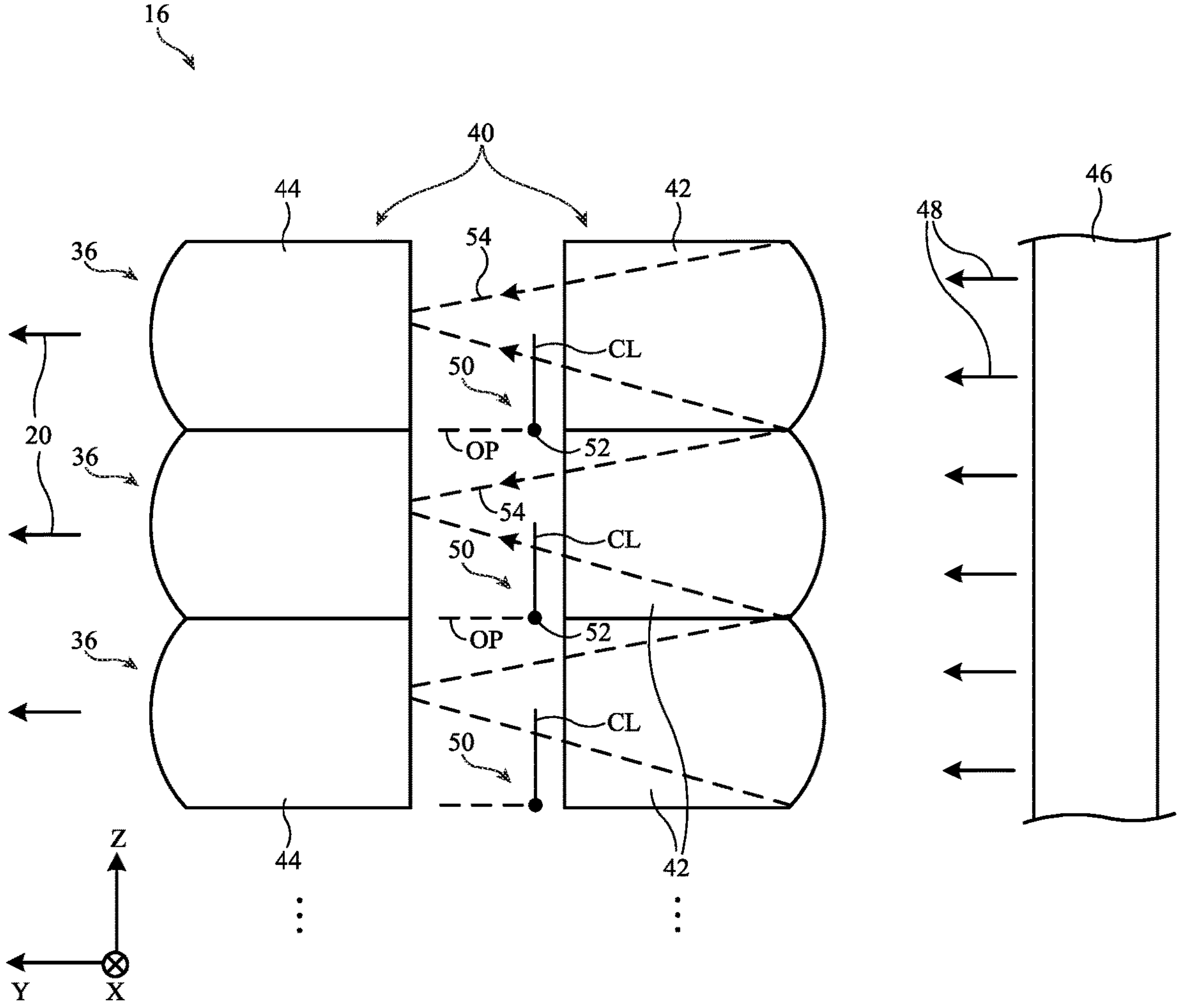
FIG. 4 is a cross-sectional side view of a portion of an illustrative light in accordance with an embodiment.

FIG. 4 is a cross-sectional side view of a portion of light 16. As shown in FIG. 4, each lens 40 may have an input lens element 42 and an output lens element 44 arranged in series. Lenses 40 in the example of FIG. 4 lie within a common plane (the XZ plane). If desired, lenses 40 may conform to different vehicle body shapes and/or may otherwise ne arranged in a nonplanar ring (e.g., lenses 40 may be staggered so that different lenses 40 have different positions along the Y axis of FIG. 4).

Lens elements (lenses) 44 and 42 may be formed from any suitable transparent material (e.g., glass, polymer, etc.). In an illustrative configuration, lenses 44, which may sometimes be referred to as output lenses, are configured to from a microlens array that supplies illumination 20 to roadway 14 (FIG. 1) and lenses 42 are freeform preshaping lenses that help preshape collimated light 48 before this light reaches the input surfaces of lenses 40.

During operation of light 16, collimated light source 46 provides collimated light 48 to each light element 36. In particular, collimated light 48 is provided to the inputs of preshaping lenses 42 and is preshaped by lenses 42 to produce preshaped light 54. Preshaped light 54 is provided as output light from the outputs of lenses 42 to the inputs of lenses 44 and exits lenses 44 as illumination 20.

As shown in FIG. 4, a respective shutter 50 may be placed between each input lens element 42 and output lens element 44. Shutters 50 may be configured to block some of light 54 when light 16 is operating in a low-beam mode and to pass all of light 54 when light 16 is operating in a high-beam mode. The preshaping function of input lens elements 42 may help ensure that a satisfactory low-beam output pattern is produced for illumination 20 without sacrificing overall light efficiency (e.g., without blocking excessive amounts of light 54 during low beam operation).

Shutters 50 may be electrically controlled (e.g., using control signals supplied by the control circuitry of vehicle 10). Shutters 50 may be electrically adjustable light modulators or may be mechanical shutters moved by actuators. During operation, shutters 50 may be placed in either a closed position CL or an open position OP. For example, a mechanical shutter may be moved between closed position CL and open position OP using an electrically controlled electromechanical actuator 52.

Figure 5:
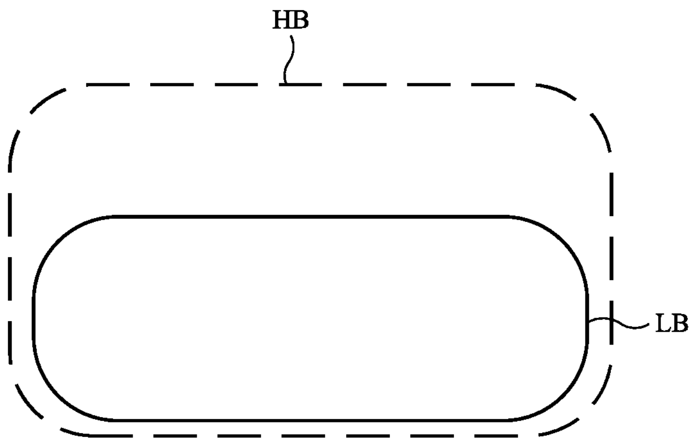
FIG. 5 is a diagram showing illustrative low beam and high beam illumination that may be supplied by a light in accordance with an embodiment.

In open position OP, all of the preshaped light 54 that is produced by the lens 42 of a given light element 36 passes by shutter 50 and is provided to a corresponding output lens 44 in that given light element 36 to contribute to a desired high-beam pattern of output illumination 20 (e.g., high-beam illumination). When it is desired to transition between high-beam mode and low-beam mode, the shutter 50 of the given light element 36 may be moved from its open position OP to its closed position CL. In closed position CL, shutter 50 will block some of preshaped light 54, thereby producing a low-beam pattern of output illumination 20. FIG. 5 shows illustrative patterns of illumination 20 that may be produced by each light 16. These patterns may include low beam pattern LB (produced when shutters 50 are closed) and high-beam pattern HB (produced when shutters 50 are opened).

Figure 6:
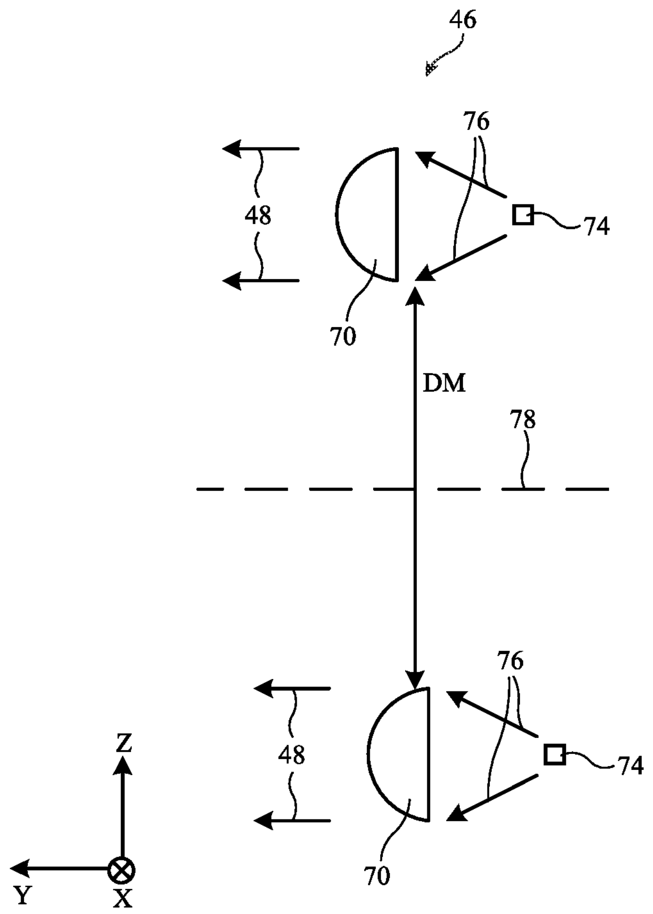
FIG. 6 is a cross-sectional side view of an illustrative collimated light source having a ring of lenses in accordance with an embodiment.
Figure 7:
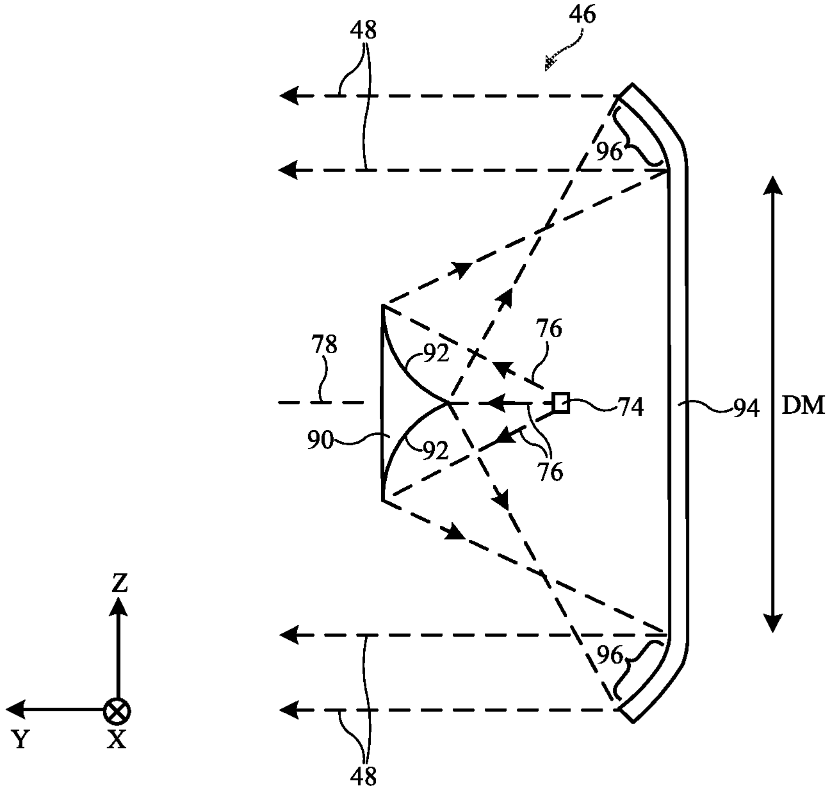
FIGS. 7 and 8 are cross-sectional side views of illustrative collimated light sources having reflective optical elements in accordance with embodiments.
Figure 8:
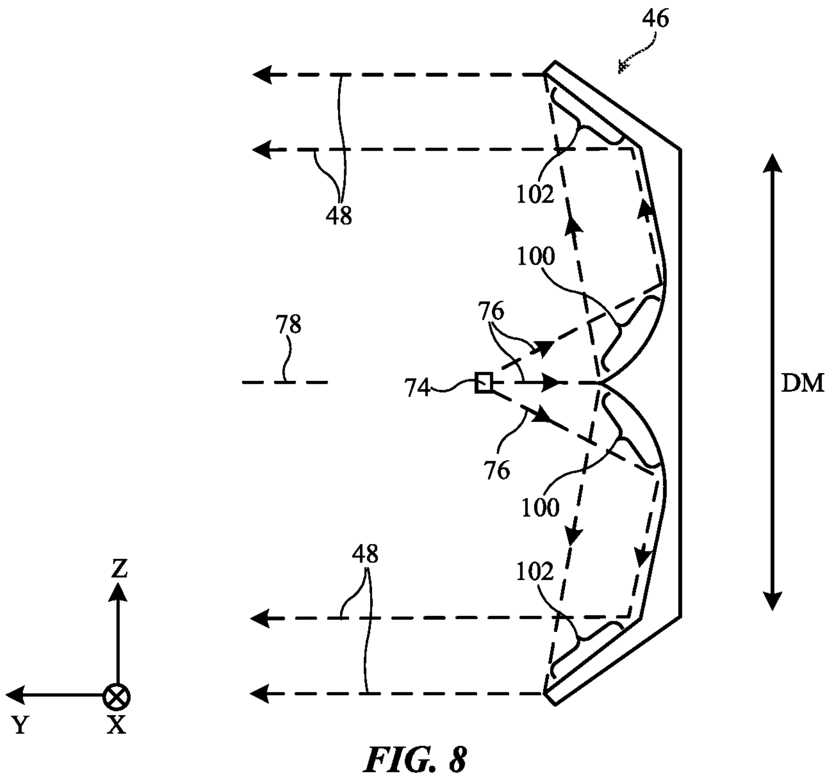

Collimated light source 46 may receive light from one or more light-emitting diodes (e.g., white light-emitting diodes) and may use collimating optics to collimate light emitted from the light-emitting diodes. The collimating optics in light source 46 may include optical elements such as lenses (e.g., polymer lenses that collimate light by refraction) and reflectors (e.g., reflective lenses and/or mirrors formed from polymer substrates coated with a reflective coating such as an aluminum coating). FIG. 6 is a diagram of an illustrative collimated light source based on refractive optics. FIGS. 7 and 8 are diagrams of illustrative collimated light sources based on reflective optics.

As shown in FIG. 6, collimated light source 46 may have collimation lenses 70 (e.g., refractive lenses formed from polymer, glass, or other transparent material). Lenses 70 may be arranged in a ring having central axis 78 and diameter DM. Diameter DM of FIG. 6 may match the diameter of ring portion 32 of light 16 of FIG. 1. Each lens 70 may be sufficiently large to supply collimated light 48 to numerous lenses 40 (e.g., at least 10 at least 40, fewer than 200, fewer than 100, etc.).

Collimated light source 46 may also have a ring of light-emitting diodes 74. Light-emitting diodes 74 may be arranged in a ring about central axis 78 so that each of light-emitting diodes 74 is associated with a corresponding one of lenses 70. Light-emitting diodes 74 may be white light emitting diodes and may emit diverging light 76. The diverging emitted light from each light-emitting diode 74 may be received at the input the lens 70 that is associated with that diode. As the emitted light from the light-emitting diodes passes through lenses 70, lenses 70 collimate this light to produce a ring of collimated light 48 of diameter DM. The ring of collimated light 48 that is produced by light source 46 of FIG. 6 may be supplied to the input of lenses 40 of light elements 36 (e.g., the inputs of lens 42), as shown in FIG. 4.

In the example of FIG. 7, collimated light source 46 has a single light-emitting diode 74 (or a cluster of light-emitting diodes located at a single location). Light source 46 of FIG. 7 has a first reflector 90 with reflective surface 92 and a second reflector 94 with reflective surface 96. Reflectors 90 and 94 may be formed from a substrate material such as polymer coated with a reflective coating such as an aluminum coating. Reflective surface 92 may have an elliptical cross-sectional profile that is rotationally symmetric about central axis 78 (e.g., reflector 90 may have a circular footprint when viewed along the +Y direction). Reflective surface 96 may have a parabolic cross-sectional shape and may have a ring shape of diameter DM surrounding central axis 78. Reflective surface 92 forms a first reflective lens element (e.g., a first lens element with a circular outline when viewed in the +Y direction). Reflective surface 96 forms a second reflective lens element (e.g., a second lens element with a ring-shaped outline). During operation, diverging emitted light 76 that is emitted by light-emitting diode 74 in the +Y direction is reflected from the first reflective lens element formed from surface 92 to the second reflective lens element formed from surface 96. The second reflective lens element reflects this light in the +Y direction as a ring of collimated light 48 (e.g., a ring of collimated light of diameter DM that is rotationally symmetric with respect to central axis 78). The ring of collimated light 48 that is produced by light source 46 of FIG. 7 may be supplied to the input of lenses 40 of light elements 36 of FIG. 4.

In the example of FIG. 8, collimated light source 46 has a single reflector substrate forming reflector 104. An aluminum coating or other reflective coating is provided on reflector 104 to form circular reflective lens element 100 and ring-shaped planar reflective element 102 (sometimes referred to as a ring-shaped mirror). R reflective element 100 has a circular outline when viewed along the −Y axis and has a reflective surface with a parabolic cross-sectional profile that is rotationally symmetric about central axis 78. Reflective element 102 has a reflective surface with a ring shape with diameter DM that is rotationally symmetric about central axis 78. The cross-sectional profile of element 102 is straight (a line). During operation, light-emitting diode 74 (or a cluster of light-emitting diodes at the location of diode 74 of FIG. 8) emits diverging light 76 (e.g., white light). Light 76 is emitted in the −Y direction and illuminates reflective lens element 100. Lens element 100 reflects this light to element 102, which reflects this light in the +Y direction as a ring of collimated light 48. The ring of collimated light 48 that is emitted by light source 46 of FIG. 8 has a diameter DM and is rotationally symmetric about central axis 78. Light 48 is supplied to the input of lenses 40 of light elements 36 of FIG. 4.

The foregoing is merely illustrative and various modifications can be made to the described embodiments. The foregoing embodiments may be implemented individually or in any combination.

What is claimed is:

1. A vehicle exterior light assembly, comprising:
- a collimated light source configured to produce collimated light, wherein the collimated light source is configured to produce a ring of the collimated light, and wherein the collimated light source comprises:
  - a light emitter that emits light;
  - a first reflective lens element that reflects the emitted light; and
  - a second reflective lens element that reflects the emitted light reflected from the first reflected lens element to produce the ring of the collimated light; and
- an array of light elements that receive the collimated light.

2. The vehicle exterior light assembly defined in claim 1 wherein the array of light elements is a ring-shaped array of light elements, wherein the light elements each includes a lens that receives the collimated light and that emits illumination, and wherein each lens includes a preshaping lens element and an output lens element arranged in series.

3. The vehicle exterior light assembly defined in claim 2 wherein each light element includes an electrically adjustable shutter between the preshaping lens element of that light element and the output lens element of that light element and wherein the electrically adjustable shutter is configured to move between a closed position in which the illumination has a low-beam pattern and an open position in which the illumination has a high-beam pattern.

4. The vehicle exterior light assembly defined in claim 1 wherein the array of light elements is a ring-shaped array of light elements, and wherein the ring-shaped array of light elements has at least 50 light elements each of which emits a separate beam of illumination.

5. The vehicle exterior light assembly defined in claim 4 wherein each of the light elements has a respective shutter.

6. The vehicle exterior light assembly defined in claim 1 wherein the array of light elements is a ring-shaped array of light elements.

7. The vehicle exterior light assembly defined in claim 6 wherein the first reflective lens element has a circular outline and has a reflective surface with an elliptical cross-sectional profile.

8. The vehicle exterior light assembly defined in claim 7 wherein the second reflective lens element has an additional reflective surface with a ring shape and a parabolic cross-sectional profile.

9. The vehicle exterior light assembly defined in claim 1 wherein the array of light elements is a ring-shaped array of light elements, and wherein each light element comprises a first lens element configured to receive the collimated light and a second lens element configured to receive light from the first lens element and emit a corresponding beam of illumination.

10. The vehicle exterior light assembly defined in claim 9 wherein each light element has a shutter between the first lens element and the second lens element.

11. The vehicle exterior light assembly defined in claim 10 wherein the shutter of each light element is configured to move between a closed position in which some of the light from the first lens element is blocked from reaching the second lens element and an open position in which all of the light from the first lens element is allowed to pass to the second lens element.

12. The vehicle exterior light assembly defined in claim 11 wherein there are at least 100 light elements in the ring-shaped array.

13. A vehicle exterior light assembly comprising:
- a collimated light source configured to emit collimated light, wherein the collimated light source is configured to produce a ring of the collimated light, and wherein the collimated light source comprises:
  - a light emitter that emits light;
  - a reflective lens element that reflects the emitted light; and
  - a mirror element that reflects the emitted light reflected from the reflective lens element to produce the ring of the collimated light; and
- an array of light elements, each light element having:
  - a first lens configured to receive the collimated light and configured to produce corresponding output light; and
  - a second lens configured to receive the output light from the first lens and configured to provide a corresponding beam of illumination.

14. The vehicle exterior light assembly defined in claim 13 wherein the array of light elements is a ring-shaped array of light elements, wherein each light element has a shutter between the first lens and the second lens of that light element, and wherein the shutter is configured to move between a closed position and an open position.

15. The vehicle exterior light assembly defined in claim 13 wherein the reflective lens element has a circular outline and a reflective surface with a parabolic cross-sectional profile.

16. The vehicle exterior light assembly defined in claim 15 wherein the mirror element has a ring shape and a straight cross-sectional profile.

17. A vehicle light comprising:
- a collimated light source configured to emit collimated light, wherein the collimated light source comprises a light emitter that emits diverging light to produce a ring of the collimated light; and an array of light elements configured to receive the collimated light and produce corresponding illumination, wherein:

each light element comprises a preshaping lens configured to receive the collimated light, an output lens configured to receive preshaped light from the preshaping lens and to provide a corresponding beam of the illumination, and an electrically adjustable shutter between the preshaping lens and the output lens; and the electrically adjustable shutter is configured to move between a low-beam position in which a portion of the preshaped light from the preshaping lens is blocked and a high-beam position in which the preshaped light from the preshaping lens is allowed to pass to the output lens.

18. The vehicle light defined in claim 17 wherein the array of light elements is a ring-shaped array of light elements, wherein the collimated light source has a ring of collimation lenses, and wherein each collimation lens is configured to supply collimated light to a plurality of the light elements.

19. The vehicle light defined in claim 18 wherein the collimated light source has a ring of light-emitting diodes each of which emits light into a respective one of the collimation lenses.

20. The vehicle light defined in claim 18 wherein the collimated light source comprises a single light emitter that emits the diverging light to produce the ring of the collimated light.

* * * * *